(12) United States Patent
Han et al.

(10) Patent No.: US 9,710,092 B2
(45) Date of Patent: Jul. 18, 2017

(54) BIOMETRIC INITIATED COMMUNICATION

(71) Applicant: Apple Inc., Cupertino, CA (US)

(72) Inventors: Byron B. Han, Cupertino, CA (US); Craig A. Marciniak, San Jose, CA (US); John A. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 535 days.

(21) Appl. No.: 13/840,770

(22) Filed: Mar. 15, 2013

(65) Prior Publication Data

US 2014/0002388 A1 Jan. 2, 2014

Related U.S. Application Data

(60) Provisional application No. 61/666,769, filed on Jun. 29, 2012.

(51) Int. Cl.
| | |
|---|---|
| *G06F 3/0488* | (2013.01) |
| *G06F 3/041* | (2006.01) |
| *H04M 1/725* | (2006.01) |
| *H04M 1/67* | (2006.01) |

(52) U.S. Cl.
CPC .......... *G06F 3/0414* (2013.01); *G06F 3/0488* (2013.01); *H04M 1/72541* (2013.01); *H04M 1/67* (2013.01); *H04M 2250/22* (2013.01)

(58) Field of Classification Search
CPC ......... G06F 3/0414; G06F 2203/04104; G06F 2203/04105; G06F 3/0488
USPC ........... 345/156, 173, 174; 178/18.01–18.07, 178/19.01–19.05
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| | (Continued) | |

FOREIGN PATENT DOCUMENTS

| | | |
|---|---|---|
| CN | 102461133 | 5/2012 |
| EP | 2226741 | 9/2010 |
| | (Continued) | |

OTHER PUBLICATIONS

International Search Report and Written Opinion dated Oct. 24, 2013, PCT/US2013/047830, 11 pages.

*Primary Examiner* — Ricardo L Osorio
(74) *Attorney, Agent, or Firm* — Brownstein Hyatt Farber Schreck, LLP

(57) ABSTRACT

A device has a touch processing module that processes touch screen input to determine if the manner in which the input was entered indicates that the user intends for execution of a particular command. In one embodiment, the module may acquire fingerprint data from the user's input and analyze the data to determine if the input was entered with a particular finger or finger sequence. In another embodiment, the module may also acquire timing data from the user's entry of a plurality of inputs and analyze the timing data to determine if the touch screen input was entered with a particular timing or cadence. In still another embodiment, the module may also acquire force data from the user's entry of a plurality of touch screen inputs and analyze the force data to determine to determine if the touch screen input was entered with a particular force.

19 Claims, 5 Drawing Sheets

(56) References Cited

U.S. PATENT DOCUMENTS

| | | |
|---|---|---|
| 6,888,536 B2 | 5/2005 | Westerman et al. |
| 7,697,729 B2 | 4/2010 | Howell et al. |
| 8,023,700 B2 | 9/2011 | Riionheimo |
| 9,235,733 B2 | 1/2016 | Birdwell et al. |
| 2008/0030301 A1* | 2/2008 | Terao .................... 340/5.53 |
| 2008/0267465 A1* | 10/2008 | Matsuo et al. ............ 382/126 |
| 2010/0158328 A1* | 6/2010 | Lee ........................ 382/124 |
| 2010/0192096 A1* | 7/2010 | Barrett .................... 715/811 |
| 2011/0078771 A1 | 3/2011 | Griffin |
| 2011/0319051 A1 | 12/2011 | Reitnour |
| 2012/0154296 A1* | 6/2012 | Hinckley et al. ......... 345/173 |
| 2013/0173925 A1* | 7/2013 | Yen et al. ................ 713/186 |

FOREIGN PATENT DOCUMENTS

| | | |
|---|---|---|
| EP | 2230623 | 9/2010 |
| WO | WO 2010/107827 | 9/2010 |

* cited by examiner

BIOMETRIC INITIATED COMMUNICATION

CROSS-REFERENCE TO RELATED APPLICATION

The present application claims the benefit under 35 U.S.C. §119(e) to U.S. Provisional Patent Application No. 61/666,769, which was filed on Jun. 29, 2012, and entitled "Biometric Initiated Communication," which is incorporated by reference as if fully disclosed herein.

TECHNICAL FIELD

The present invention relates generally to electronic devices, and more specifically to electronic devices that execute commands in response to receipt of biometric or other information indicating certain predetermined commands.

BACKGROUND

Electronic devices, such as mobile or cellular phones, may be equipped with functionality for contacting emergency services in an expedited manner. For example, a mobile phone may prominently display instructions for contacting "911" or other emergency services in a way that by-passes password entry or log-in screens. However, when a user utilizes a mobile phone to contact emergency services in this way, that fact that he is doing so can be readily apparent to someone watching his actions. Thus, in a situation where the device owner is forced to unlock or otherwise use his phone by an assailant, contacting emergency services in the conventional manner may not be practical. Accordingly, in conventional systems, a user is unable to comply with an assailant's commands, while at the same time discreetly contacting emergency services.

SUMMARY

Examples of embodiments described herein may take the form of an electronic device having a touch processing module that processes touch screen input to determine if the manner in which the touch screen input was entered indicates that the user intends for the electronic device to execute a particular command.

In one embodiment, the touch processing module acquires fingerprint data from the user's entry of touch screen input, and analyzes the fingerprint data to determine if the touch screen input was entered with a particular finger or finger sequence that the user has predetermined to indicate a particular command.

In another embodiment, the touch processing module may also acquire timing data from the user's entry of a plurality of touch screen inputs, and analyze the timing data to determine if the touch screen input was entered with a particular timing or cadence that the user has predetermined to indicate a particular command.

In still another embodiment, the touch processing module may also acquire force data from the user's entry of a plurality of touch screen inputs, and analyze the force data to determine to determine if the touch screen input was entered with a particular force that the user has predetermined to indicate a particular command.

In accordance with various example embodiments described herein, a electronic device may execute a particular command if the manner in which touch screen input was entered indicates that the user intends for the electronic device to execute the particular command. The electronic device may execute the particular command discreetly so that no indication of the execution is apparent. The electronic device may also execute the particular command concurrently with a command that is explicitly indicated by the touch screen input. In one embodiment, the manner in which touch screen input was entered indicates a panic command to which the electronic device responds by calling emergency services and providing geographic location information and/or streaming audio or video from the electronic device. In another embodiment, the manner in which touch screen input was entered indicates a macro command that includes a series of commands that when executed together execute the macro command.

SPECIFICATION

This disclosure relates generally to an electronic device having a touch processing module that processes touch screen input to determine if the manner in which the touch screen input was entered indicates that the user intends for the electronic device to execute a particular command. In making such a determination, various electronic device embodiments use fingerprint data, timing data, and/or force data that is acquired from the user as the user enters a touch screen input. An electronic device in accordance with embodiments discussed herein may execute a particular command if the user enters touch screen input in a manner that indicates that the user intends for the electronic device to execute the particular command. Such a command may differ from the explicit command that is specified by the touch screen input itself. By executing a command in this way, the electronic device is able to execute a command discreetly so that no indication of the execution is apparent.

Figure 1:
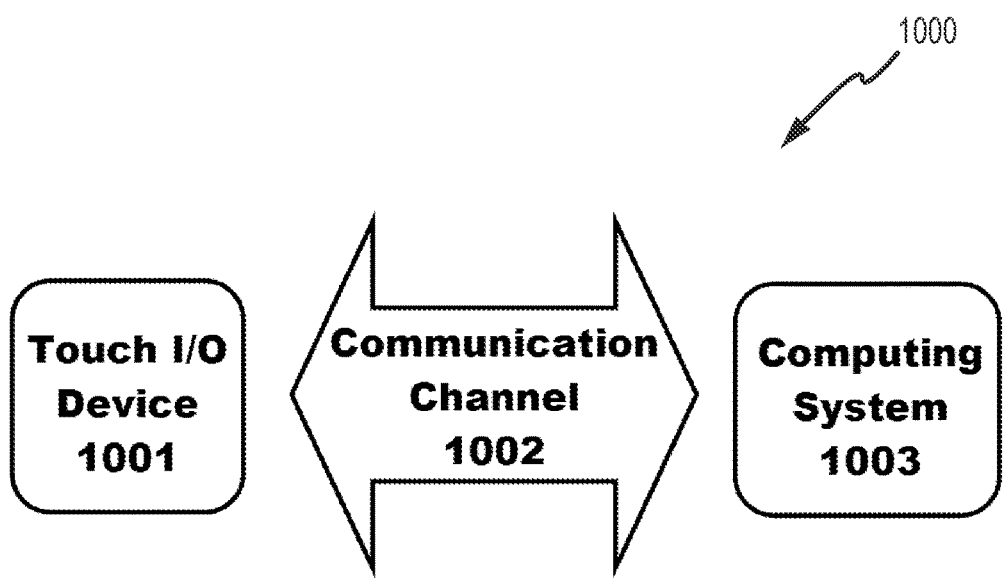
FIG. 1 is a schematic illustration of a electronic device embodiment that includes a touch screen device provided in association with a computing system.

Embodiments described herein may be configured to operate with a variety of sensors, including strip or swipe sensors, array or other two-dimensional sensors, and the like. FIG. 1 is a schematic illustration of an electronic device 1000 in accordance with embodiments discussed herein. As shown in FIG. 1, an electronic device 1000 embodiment may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003. In various embodiments described herein, the computing system 1003 may be operable to acquire a fingerprint from a finger that is used to enter inputs through the touch I/O device 1001. The computing system 1003 may also be operable to acquire timing and/or force information associated with inputs that are entered through the touch I/O device 1001.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to deice 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 2:
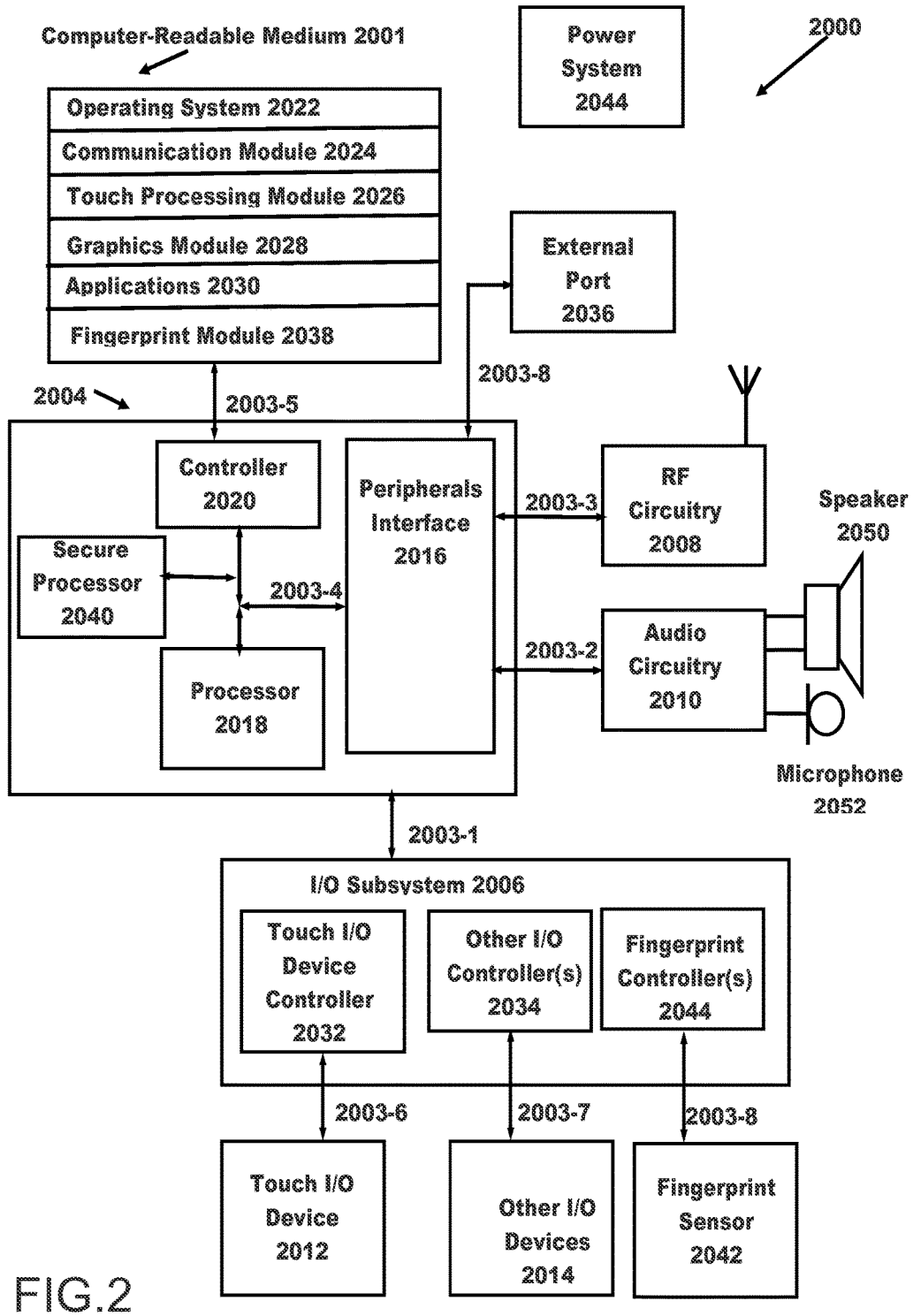
FIG. 2 is a schematic illustration of system architecture for the electronic device shown in FIG. 1.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 2 is a block diagram of one embodiment of system 2000 that generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in FIG. 2 is only one example architecture of system 2000, and that system 2000 could have more or fewer components than shown, or a different configuration of components. The various components shown in FIG. 2 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032. The touch processing module 2026 may be configured to processes touch screen input to determine if the manner in which the touch screen input was entered indicates that the user intends for the electronic device to execute a particular command. Various aspects of this function of the touch processing module are described herein in connection with FIGS. 3-5.

System 2000 may further include a fingerprint sensing module 2038 that may at least be executed to perform, or function to perform, various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The secure processor 2040 may be implemented as one or more processing units. The secure processor may be implemented as one or more processing units. The operation of these various elements will now be described.

The fingerprint sensor 2042 may operate to capacitively capture a series of images, or nodes. When taken together, these nodes may form a fingerprint. The full set of nodes may be referred to herein as a "mesh." Although the fingerprint sensor is described as operating capactively, it is understood that this is an example. In various implementations, the fingerprint sensor be optical, capacitive, ultrasonic, and/or any other such mechanism for capturing one or more images and one or more portions of one or more fingerprints. It is understood that the embodiments discussed herein may operate with any suitable fingerprint sensor, including swipe or strip sensors, array or other two-dimensional sensors, and so on.

Each node in the mesh may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the mesh.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. The fingerprint data is encrypted, obfuscated, or otherwise prevented from being accessed by an unauthorized device or element, by any of the fingerprint sensor 2042, the fingerprint I/O controller 2044 or another element prior to being transmitted to either processor. The secure processor 2040 may decrypt the data to reconstruct the node. In some embodiments, unencrypted data may be transmitted directly to the secure processor 2040 from the fingerprint controller 2044 (or the sensor 2042 if no controller is present). The secure processor may then encrypt this data.

Fingerprint data, either as nodes or meshes, may be stored in the computer-readable medium 2001 and accessed as necessary. In some embodiments, only the secure processor 2040 may access stored fingerprint data, while in other embodiments either the secure processor or the processor 2018 may access such data.

Figure 3:
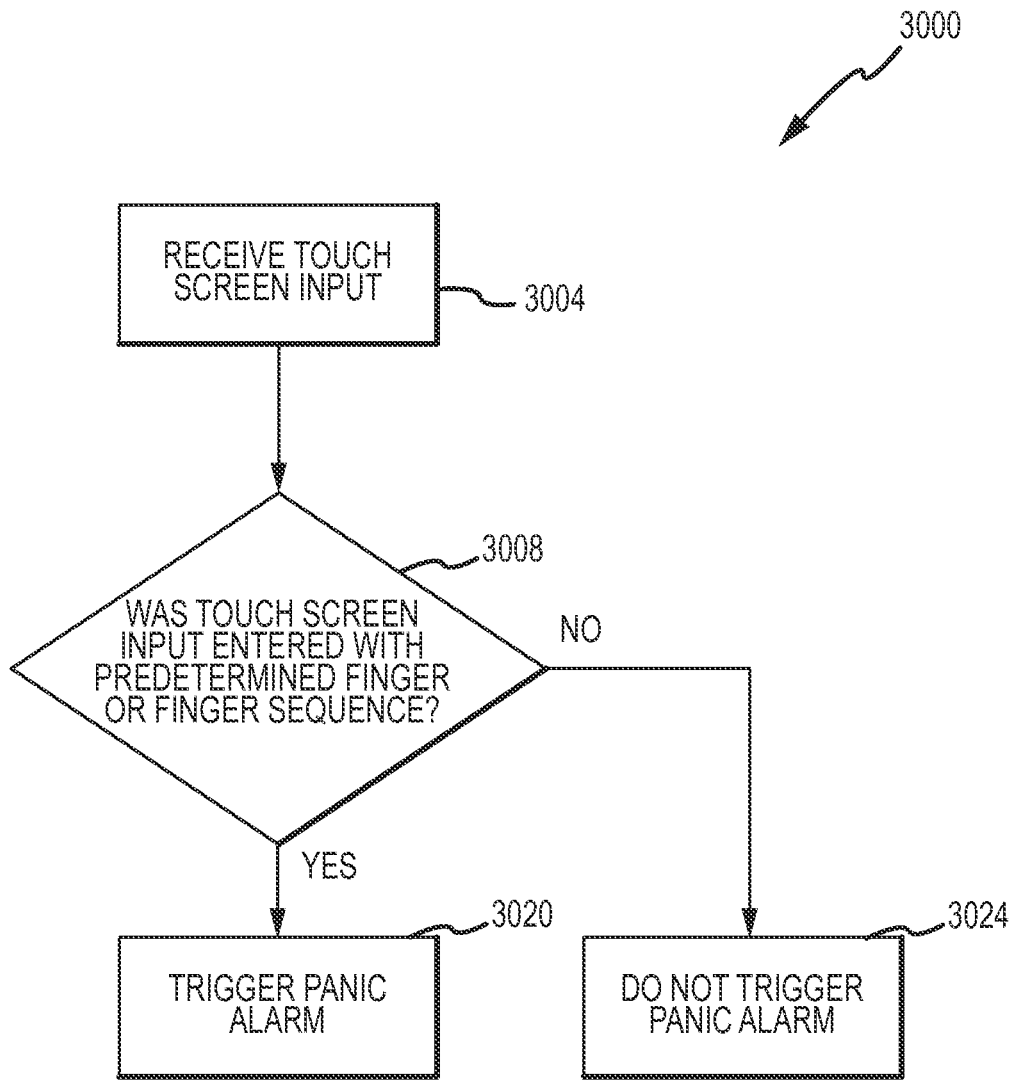
FIG. 3 is a flow chart illustrating a first method of processing touch input in an electronic device to extract commands to be executed by the electronic device.

FIG. 3 is a flow chart 3000 illustrating a first touch processing method embodiment. Initially, in operation 3004, the touch processing module 2026 acquires fingerprint data from touch input that is entered into the electronic device 1000 through a fingerprint sensor. This sensor may be associated with a touch screen, input (e.g., a button or switch), housing, and so on. The sensor may underlie such elements or other be adjacent or proximate thereto. Once the touch processing module 2026 acquires fingerprint data in operation 3004, control may pass to operation 3008.

In operation 3008, touch processing module 2026 analyzes the fingerprint data to determine if the manner in which the touch input was entered indicates that the user intends for the electronic device 1000 to execute a particular command. The touch input may command an otherwise routine operation of the electronic device 1000, such as entering a number into a keypad to unlock the device. However, the touch input may be entered with a particular finger or sequence of fingers that the user has predetermined to indicate a command to be executed by the electronic device.

The correlation between a particular finger or sequence of fingers may be programmed by the user at an earlier time. For example, the user may program the electronic device to recognize input entered with her pinky finger as a command to place a "911" call or otherwise contact emergency services. In another example, the user may program the electronic device to recognize input entered with a particular sequence of fingers, such as pinky-ring-pinky, as a command to make an emergency call. Thus, regardless of what routine command the user is ostensibly entering, if the user enters the routine command with the predetermined finger or finger sequence, the user is also entering the predetermined command. For example, a user may be ostensibly be unlocking her device, but by doing so with her predetermined "911 finger" she is also calling the police.

In analyzing the fingerprint data, the touch processing module 2026 matches a list of one or more predetermined commands with the acquired fingerprint data. If the touch processing module 2026 discovers that fingerprint data indicates that the user intends for the electronic device to execute a particular command, then control passes to operation 3020, where the command is executed. If not, then control passes to operation 3024. In operation 3024, no predetermined finger or finger sequence command is executed. Nevertheless, any routine command that is indicated by the touch input may be executed in operation 3024.

Figure 4:
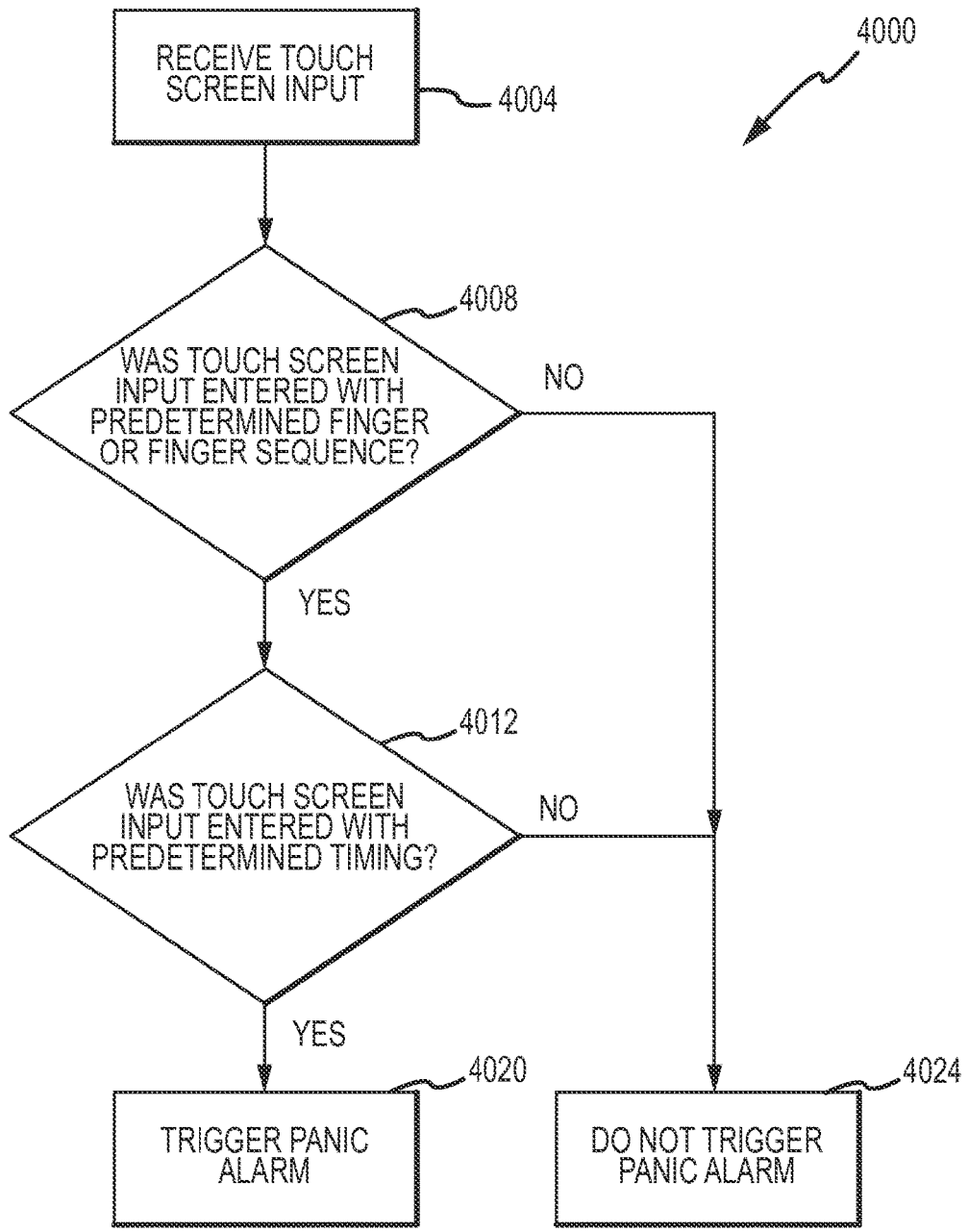
FIG. 4 is a flow chart illustrating a second method of processing touch input in an electronic device to extract commands to be executed by the electronic device.

FIG. 4 is a flow chart 4000 illustrating a second touch processing method embodiment. In the method illustrated by flow chart 4000, a predetermined command is indicated by both fingerprint data and timing data. By analyzing both fingerprint and timing data, the method illustrated in FIG. 4 has a greater level of entropy that of the method illustrated in FIG. 3.

Initially, in operation 4004, the touch processing module 2026 acquires fingerprint data from touch input, as described above in connection with operation 3004. Additionally, the touch processing module 2026 acquires timing data as the touch input is entered through the touch screen. In one embodiment, the timing data includes time intervals between separate touches that together make-up the touch input. Once the touch processing module 2026 acquires fingerprint data and timing data in operation 4004, control may pass to operation 4008.

In operation 4008, touch processing module 2026 analyzes the fingerprint data to determine if the manner in which the touch input was entered indicates that the user intends for the electronic device to execute a particular command, as described above in connection with operation 3008. If the touch processing module 2026 discovers that fingerprint data indicates that the user intends for the electronic device to execute a particular command, then control passes to operation 4012. If not, then control passes to operation 4024.

In operation 4012, touch processing module 2026 analyzes the timing data to determine if the manner in which the touch input was entered indicates that the user intends for the electronic device to execute a particular command. Specifically, the touch input may be entered with a particular speed or cadence that the user has been predetermined to indicate a command to be executed by the electronic device. Like the correlations between a finger or a finger sequence and a particular command, the correlations between speed or cadence and a particular command may be programmed by the user at an earlier time.

If the touch processing module 2026 discovers that the timing data indicates that the user intends for the electronic device to execute a particular command, then control passes to operation 4020, where the command is executed. If not, then control passes to operation 4024. As described above in connection with operation 3024, no predetermined command is executed in operation 4024. Nevertheless, any routine command that is indicated by the touch input may be executed in operation 3024.

Figure 5:
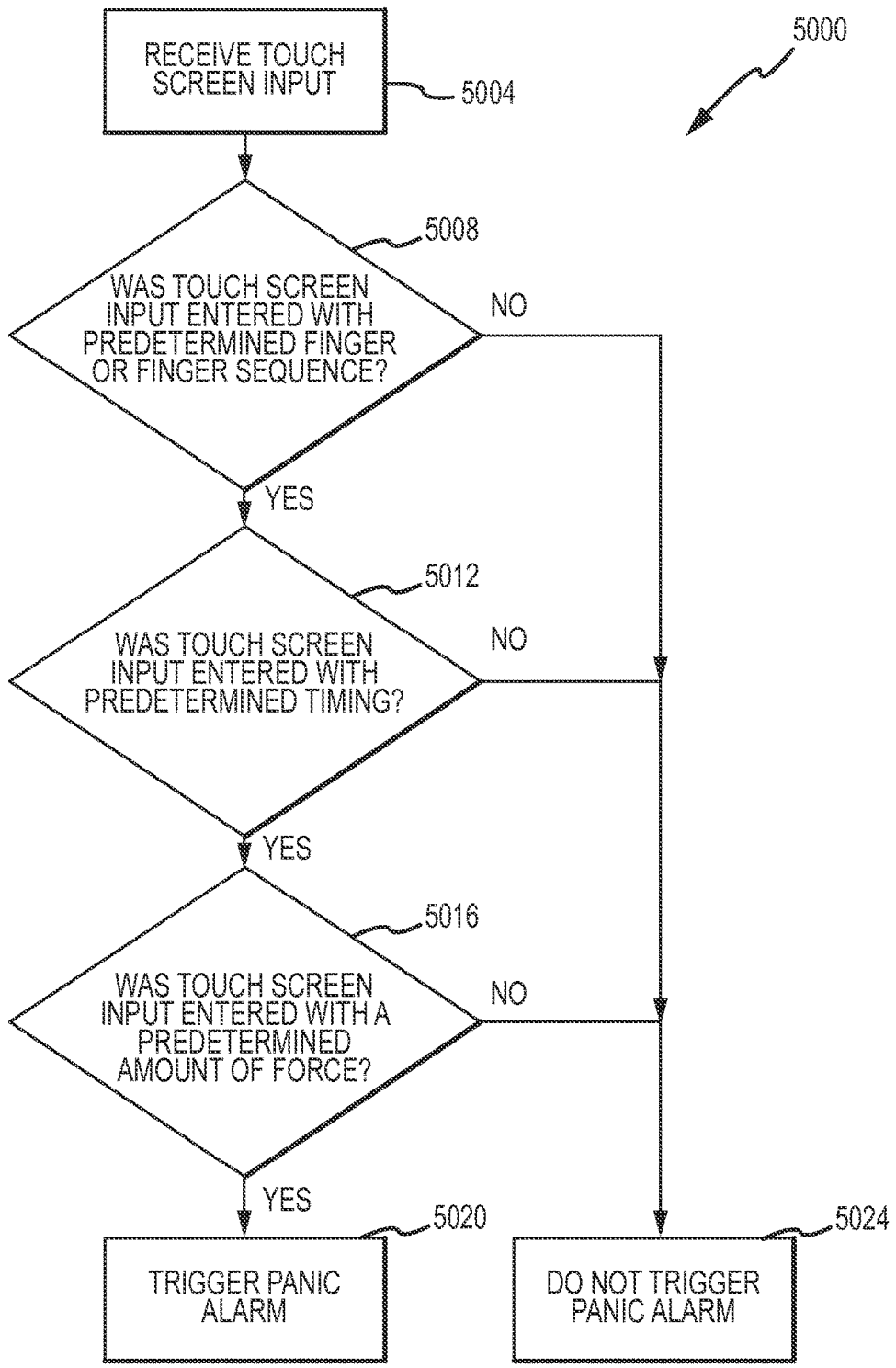
FIG. 5 is a flow chart illustrating a third method of processing touch input in an electronic device to extract commands to be executed by the electronic device.

FIG. 5 is a flow chart 5000 illustrating a third touch processing method embodiment. In the method illustrated by flow chart 5000, a predetermined command is indicated by both fingerprint data and timing data. By analyzing fingerprint data, timing data and force data, the method illustrated in FIG. 5 has a greater level of entropy that of the methods illustrated in FIGS. 3 and 4.

Initially, in operation 5004, the touch processing module 2026 acquires fingerprint data and timing data from touch input, as described above in connection with operation 4004. Additionally, the touch processing module 2026 acquires force data as the touch input is entered through the touch screen. In one embodiment, the forced data indicates an amount of force applied by one or more fingertips of the user against the touch screen as the touch input was entered. Once the touch processing module 2026 acquires fingerprint data, timing data, and force data in operation 5004, control may pass to operation 5008.

In operation 5008, touch processing module 2026 analyzes the fingerprint data to determine if the manner in which the touch input was entered indicates that the user intends for the electronic device to execute a particular command, as described above in connection with operation 3008. If the touch processing module 2026 discovers that fingerprint data indicates that the user intends for the electronic device to execute a particular command, then control passes to operation 5012. If not, then control passes to operation 5024.

In operation 5012, touch processing module 2026 analyzes the timing data to determine if the manner in which the touch input was entered indicates that the user intends for the electronic device to execute a particular command, as described above in connection with operation 4012. If the touch processing module 2026 discovers that the timing data indicates that the user intends for the electronic device to execute a particular command, then control passes to operation 5016. If not, then control passes to operation 5024.

In operation 5016, touch processing module 2026 analyzes the force data to determine if the manner in which the touch input was entered indicates that the user intends for the electronic device to execute a particular command. Specifically, the touch input may be entered with a particular force that the user has been predetermined to indicate a command to be executed by the electronic device. Like the correlations between a finger or a finger sequence and a particular command, the correlations between force and a particular command may be programmed by the user at an earlier time.

If the touch processing module 2026 discovers that the force data indicates that the user intends for the electronic device to execute a particular command, then control passes to operation 5020, where the command is executed. If not, then control passes to operation 5024. As described above in connection with operation 3024, no predetermined command is executed in operation 5024. Nevertheless, any routine command that is indicated by the touch input may be executed in operation 5024.

In one implementation of the methods described herein, the user predetermines that the command indicated by a particular finger or sequence of fingers is a stealth command to be executed by the electronic without any apparent indication that the stealth command is being executed. The user could use this command to call emergency services without that fact being known to an assailant or other aggressive person that prompted the emergency call. In this way, the electronic device 1000 implements a "panic command" that may include, for example, transmitting the geographic location of the electronic device, and/or transmitting streaming audio or video from the phone. Additionally, a "panic command" may cause the electronic device 1000 to erase or hide certain data or applications from the memory of the electronic device 1000. In this way, sensitive data such as social security numbers and the like are erased so that they cannot be discovered by a perpetrator who steals the electronic device 1000.

In another implementation of the methods described herein, the user predetermines that the command indicated by a particular finger or sequence of fingers is a macro command that includes a series of commands that when executed together execute the macro command.

CONCLUSION

The foregoing description has broad application. Accordingly, the discussion of any embodiment is meant only to be an example and is not intended to suggest that the scope of the disclosure, including the claims, is limited to these examples.

What is claimed is:
1. A method of executing a command in an electronic device, comprising:

receiving touch input through a touch screen component of an electronic device;
acquiring fingerprint data from one or more fingertips of the user that are used to enter the touch input through the touch screen;
analyzing the fingerprint data to determine if the touch input was entered with a particular sequence of fingers that the user has predetermined to indicate a command to be executed by the electronic device; and
if a predetermined command is indicated by the fingerprint data, executing the command, wherein the touch input comprises a sequence of individual touch inputs separated apart in time, the method further comprising:
acquiring timing data as the touch input is entered through the touch screen, the timing data comprising time intervals between the individual touches; analyzing the fingerprint data in combination with the timing data to determine if the touch input was entered with a particular finger or sequence of fingers and with a particular timing sequence that the user has predetermined to indicate a command to be executed by the electronic device; and if a predetermined command is indicated by the fingerprint data and the timing data, executing the command.

2. The method of claim 1, wherein if a predetermined command is not indicated by the fingerprint data, the method further comprising:
executing any command that is explicitly indicated by the touch input.

3. The method of claim 1, wherein the touch input conveys an explicit command to be executed by the electronic device, and the user has predetermined that the command indicated by the particular sequence of fingers is a stealth command to be executed by the electronic device without any apparent indication that the stealth command is being executed, the method further comprising:
executing the explicit command; and
while the explicit command is executing, executing the stealth command without outputting an indication that the stealth command is executing.

4. The method of claim 3, wherein the stealth command is a panic command and the operation of executing the panic command includes sending a communication to emergency services.

5. The method of claim 4, wherein the communication to emergency services includes transmitting the geographic location of the electronic device.

6. The method of claim 4, wherein the communication to emergency services includes transmitting streaming audio or video from the electronic device.

7. The method of claim 1, further comprising:
acquiring force data as the touch input is entered through the touch screen, the force data indicating an amount of force applied by one or more fingertips of the user against the touch screen as the touch input was entered;
analyzing the fingerprint data in combination with the timing data and the force data to determine if the touch input was entered with a particular sequence of fingers, with a particular timing sequence, and with a particular amount of force, all of which the user has predetermined to indicate a command to be executed by the electronic device; and
if a predetermined command is indicated by the fingerprint data, the timing data, and the force data, executing the command.

8. The method of claim 7, wherein the predetermined command indicated by the fingerprint data, the timing data, and the force data is a panic command.

9. The method of claim 1, wherein the command indicated by the particular sequence of fingers is a macro command that includes a series of commands that when executed together execute the macro command.

10. A mobile communication device, comprising:
a processor, a touch screen communicatively coupled to the processor, the touch screen adapted to receive input through a user contacting or nearly contacting a surface of the touch screen;
a fingerprint sensor communicatively coupled to the processor and to the touch screen, the fingerprint sensor adapted to acquire fingerprint data for one or more fingertips of the user as the user enters touch input through the touch screen; and
a touch processing module stored in a computer readable storage medium, the touch processing module comprising processor-executable code that, when executed by the processor, analyzes the fingerprint data to determine if the touch input was entered with a particular sequence of fingers that the user has predetermined to indicate a command to be executed by the electronic device, wherein if a predetermined command is indicated by the fingerprint data, the processor executes the command, wherein the touch input comprises a sequence of individual touch inputs separated apart in time and the processor: acquires timing data as the touch input is entered through the touch screen, the timing data comprising time intervals between the individual touches; analyzes the fingerprint data in combination with the timing data to determine if the touch input was entered with a particular finger or sequence of fingers and with a particular timing sequence that the user has predetermined to indicate a command to be executed by the electronic device; and if a predetermined command is indicated by the fingerprint data and the timing data, executes the command.

11. The mobile communication device of claim 10, wherein if a predetermined command is not indicated by the fingerprint data, the processor executes any command that is explicitly indicated by the touch input.

12. The mobile communication device of claim 10, wherein the touch input conveys an explicit command to be executed by the electronic device, the user has predetermined that the command indicated by the particular sequence of fingers is a stealth command to be executed by the electronic device without any apparent indication that the stealth command is being executed, and the processor executes the explicit command and, while the explicit command is executing, executes the stealth command without outputting an indication that the stealth command is executing.

13. The mobile communication device of claim 12, wherein the stealth command is a panic command and the processor sends a communication to emergency services as part of executing the panic command.

14. The mobile communication device of claim 13, wherein the communication to emergency services includes transmitting the geographic location of the electronic device.

15. The mobile communication device of claim 13, wherein the communication to emergency services includes transmitting streaming audio or video from the electronic device.

16. The mobile communication device of claim 10, wherein the processor:
- acquires force data as the touch input is entered through the touch screen, the force data indicating an amount of force applied by one or more fingertips of the user against the touch screen as the touch input was entered;
- analyzes the fingerprint data in combination with the timing data and the force data to determine if the touch input was entered with a particular sequence of fingers, with a particular timing sequence, and with a particular amount of force, all of which the user has predetermined to indicate a command to be executed by the electronic device; and
- if a predetermined command is indicated by the fingerprint data, the timing data, and the force data, executes the command.

17. The mobile communication device of claim 16, wherein the predetermined command indicated by the fingerprint data, the timing data, and the force data is a panic command.

18. The mobile communication device of claim 10, wherein the command indicated by the particular sequence of fingers is a macro command that includes a series of commands that when executed together execute the macro command.

19. A method of executing a command in an electronic device, comprising:
- receiving touch input through a touch screen component of an electronic device;
- acquiring fingerprint data from one or more fingertips of the user that are used to enter the touch input through the touch screen;
- acquiring force data as the touch input is entered through the touch screen, the force data indicating an amount of force applied by one or more fingertips of the user against the touch screen as the touch input was entered;
- analyzing the fingerprint data in combination with the force data to determine if the touch input was entered with a particular sequence of fingers and with a particular amount of force, both of which the user has predetermined to indicate a command to be executed by the electronic device; and
- if a predetermined command is indicated by the fingerprint data and the force data, executing the command, wherein the touch input comprises a sequence of individual touch inputs separated apart in time, the method further comprising: acquiring timing data as the touch input is entered through the touch screen, the timing data comprising time intervals between the individual touches; analyzing the fingerprint data in combination with the timing data to determine if the touch input was entered with a particular finger or sequence of fingers and with a particular timing sequence that the user has predetermined to indicate a command to be executed by the electronic device; and if a predetermined command is indicated by the fingerprint data and the timing data, executing the command.

* * * * *